C. J. DE T. BARCLAY.
SIGNAL.
APPLICATION FILED SEPT. 10, 1918.
1,321,701.
Patented Nov. 11, 1919.
2 SHEETS—SHEET 1.
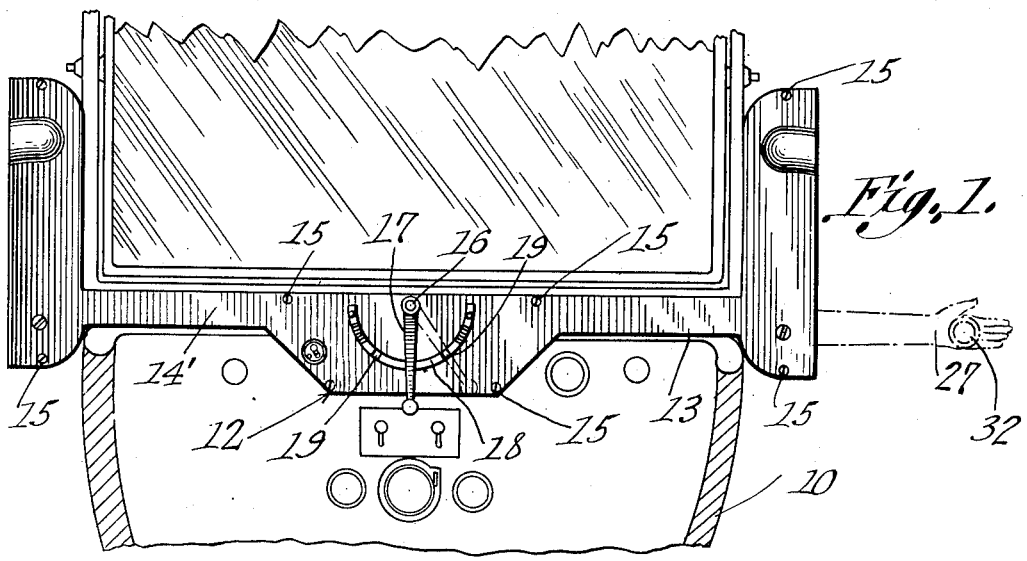
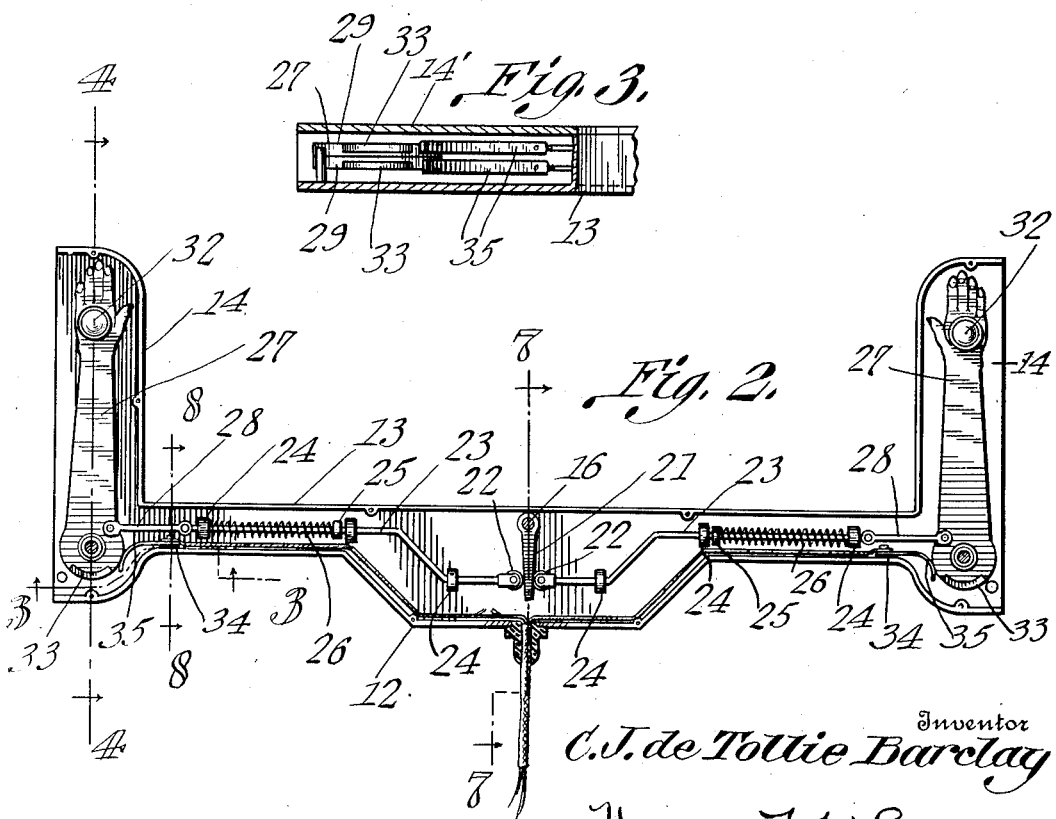
Inventor
C. J. de Tottie Barclay
By Norman T. Whitaker
his Attorney

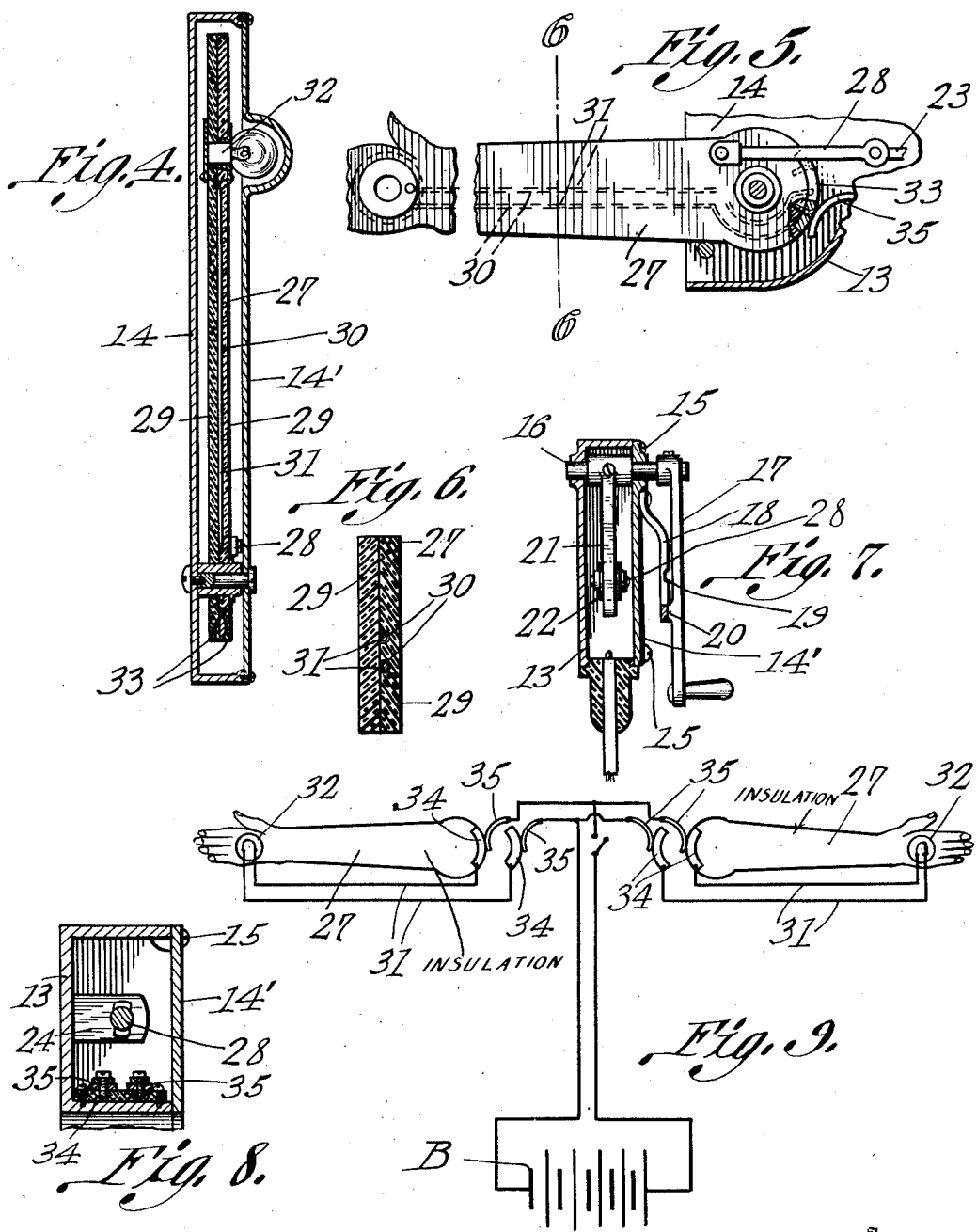

UNITED STATES PATENT OFFICE.

CHARLES JAMES DE TOLLIE BARCLAY, OF ONTARIO, CALIFORNIA.

SIGNAL.

1,321,701.  Specification of Letters Patent.  Patented Nov. 11, 1919.

Application filed September 10, 1918. Serial No. 253,473.

*To all whom it may concern:*

Be it known that I, CHARLES JAMES DE TOLLIE BARCLAY, a citizen of the United States, and a resident of Ontario, in the county of San Bernardino and State of California, have invented new and useful Improvements in Signals, of which the following is a specification.

This invention relates to signals and has particular reference to that class of signals employed in connection with automobiles and the like.

An important object of the invention is to provide in a device of the character described a means whereby the various elements comprising the device may be readily assembled in a convenient place with respect to the driver of an automobile in order that a desired signal may be quickly given.

A further object of the invention is to provide in a device of the above mentioned character a means whereby the signaling arms may be normally retained in concealment.

A further object of the invention is to provide in a device of the above mentioned character a means whereby a circuit through an electric lamp carried by the signaling arms may be closed upon the movement of the arms to a signaling position.

Other objects and advantages of the invention will be apparent during the course of the following description taken in connection with the accompanying drawings.

In the drawings, forming a part of this specification and in which like numerals are employed to designate like parts throughout the same, Figure 1 is a transverse sectional view of an automobile having the device embodying my invention installed thereupon, the device being shown in elevation, Fig. 2 is a vertical longitudinal sectional view of the device embodying my invention, Fig. 3 is a sectional view taken on line 3—3 of Fig. 2, Fig. 4 is a sectional view taken on line 4—4 of Fig. 2, Fig. 5 is a detail view of a signal arm and a circuit closure associated therewith, Fig. 6 is a transverse sectional view of a signal arm, Fig. 7 is a transverse sectional view taken on line 7—7 of Fig. 2, Fig. 8 is a transverse sectional view taken on line 8—8 of Fig. 2, and, Fig. 9 is a diagrammatic view showing the electrical wiring system employed in connection with the device.

In the drawings, wherein is shown a preferred form of my invention, the numeral 10 indicates the automobile body having an instrument board 11 in proximity to which is arranged the device embodying my invention, which device is indicated as a whole by the numeral 12 and comprises a casing 13 having elongated pockets 14 provided at the ends thereof. Upon the casing 13 there is arranged a closure 14 which is held in position by means of screws or the like as shown at 15. Within the casing 13 substantially intermediate the ends thereof is journaled a shaft 16, upon one end of which is secured an operating lever 17. In order to retain the operating lever in various desired positions there is provided an arcuate-shaped spring member 18 which is carried by the closure 14. This arcuate-shaped spring member is provided with notches 19 adapted for the reception of a lug 20 carried by the operating lever 17. To the shaft 16 there is secured an arm 21 having its free end normally engaging rollers 22 carried at the ends of reciprocating rods 23. These rods are mounted within guides 24 and are provided with collars 25 having engagement with coil springs 26 serving to retain the rods 23 normally in the position shown in Fig. 2. Within the pockets 14 there are journaled a pair of signal arms 27 adapted to be moved to the dotted line position shown in Fig. 1 by means of the reciprocating rods 23 which are connected thereto by means of links 28. These arms comprise a pair of sections 29, which sections are formed preferably of an insulating material. One of the sections is provided with a pair of grooves 30 having confined therein electric conductors 31 which are arranged in circuit with electric lamps 32 carried at the free end of the arms 27, the conductors 31 being connected also to arcuate-shaped metallic switch members 33 provided by the sections 29 relatively near the pivoted ends thereof.

Within the casing 13 there is arranged upon an insulating block 34 a pair of brushes 35 which are connected in circuit with a suitable source of electrical energy as shown at B. These brushes are arranged to contact with the arcuate-shaped metallic switch members 33 when the arms 27 are moved to the dotted line position shown in Fig. 1, thereby completing the electrical circuit through the lamps 32.

In use, the operation of the device is as follows: When it is desired to move the arm 27 to the dotted line position as shown in Fig. 1 the operating lever 17 is moved to the dotted line position shown therein, whereupon the reciprocating rod 23 is moved against the influence of the spring 26 whereupon the arm 27 is moved downwardly upon its pivot, thereby completing the electric circuit through the lamp 32 carried thereby. When the arm 27 is projected to the position shown in Fig. 1 the lug 20 enters the notch 19 provided by the arcuate-shaped spring member 18, the tension of the arcuate-shaped member 18 being sufficient to lock the operating lever in the dotted line position shown in Fig. 1, thereby locking the signal arms 27 in its dotted line position shown in Fig. 1. When it is desired to release the arm 27 from the dotted line position the operating lever 17 is moved slightly to the left whereupon the lug 20 disengages the notch 19, thereby permitting the reciprocating rod 23 to be moved to the left under the influence of the spring 26, thereby moving the arm 27 to the upright position clearly shown in Fig. 2.

It is to be understood that the form of my invention herewith shown and described is to be taken as a preferred example of the same, and that various changes in the shape, size and arrangement of parts may be resorted to without departing from the spirit of the invention or the scope of the subjoined claim.

Having thus described my invention, what I claim as new and desire to secure and protect by Letters Patent of the United States, is:

A device of the character described comprising a casing, a pair of reciprocating rods carried within said casing, a plurality of guides for each of said rods, a collar secured to each of said rods, a spring interposed between one of the guides and said collar of each rod, each spring being adapted to retain said rods in a normal position, signaling arms pivotally connected at the ends of said casing, links connecting said rods with said signaling arms, the links being pivotally connected to the arms and rods, a shaft journaled midway within said casing, an arm secured to said shaft and normally positioned between the free ends of said rods, rollers carried at the free ends of said rods and normally engaging said arm, manually operated means for partially rotating said shaft whereby one of said rods is moved independently of the other to move one of said signaling arms from a normal position to a signaling position, and means for locking said signaling arms in signaling position.

CHARLES JAMES DE TOLLIE BARCLAY.